Dec. 23, 1924.

G. LIEBERMAN

EXTRACTING MACHINE

Filed June 3, 1922

INVENTOR.
George Lieberman

BY
Hardway Cather
ATTORNEYS.

Dec. 23, 1924.
G. LIEBERMAN
EXTRACTING MACHINE
Filed June 3, 1922
1,520,190
3 Sheets-Sheet 2
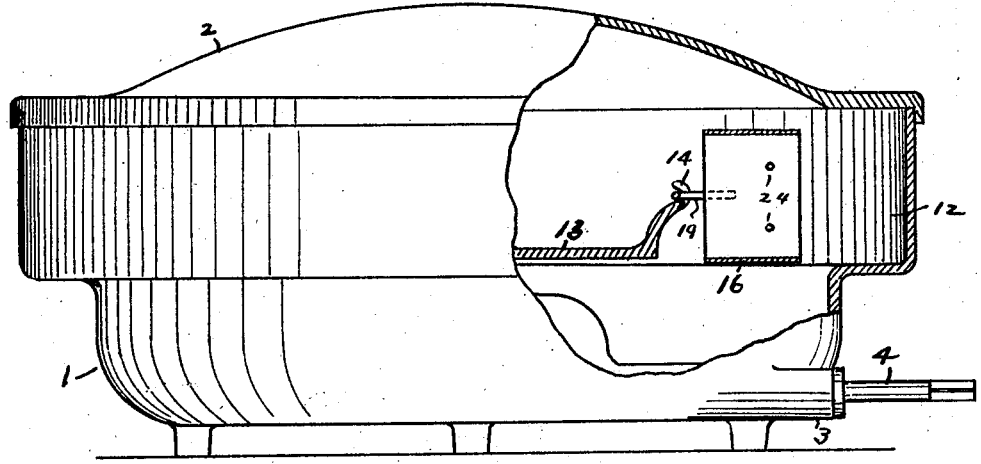
Fig. 3.
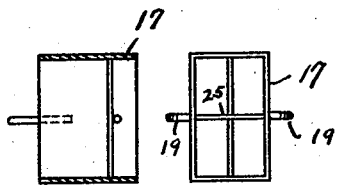
Fig. 8.  Fig. 5.  Fig. 7.  Fig. 4.
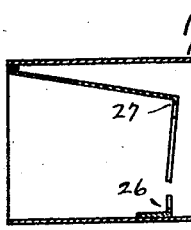 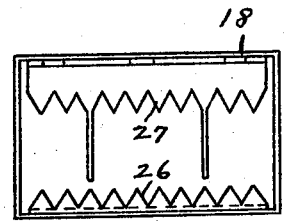
Fig. 9.  Fig. 6.
INVENTOR.
George Lieberman
BY
Hardway Cathy
ATTORNEYS Dec. 23, 1924.

G. LIEBERMAN

EXTRACTING MACHINE

Filed June 3, 1922

INVENTOR.
George Lieberman
BY
Hardway & Cather
ATTORNEYS.

Patented Dec. 23, 1924.

1,520,190

UNITED STATES PATENT OFFICE.

GEORGE LIEBERMAN, OF HOUSTON, TEXAS.

EXTRACTING MACHINE.

Application filed June 3, 1922. Serial No. 565,669.

*To all whom it may concern:*

Be it known that I, GEORGE LIEBERMAN, citizen of the United States, residing at Houston, in the county of Harris and State of Texas, have invented certain new and useful Improvements in an Extracting Machine, of which the following is a specification.

This invention relates to new and useful improvements in an extracting machine, and has particular relation to a machine specially designed for extracting crab meat from the shells by centrifugal force.

One object of the invention is to provide a machine of the character described whereby the meat of crabs or similar shell fish may be extracted by centrifugal force and completely separated from the shells.

Another object of the invention is to provide a machine of the character described which is of comparatively cheap construction and may be easily operated.

With the above and other objects in view the invention has particular relation to certain novel features of construction, operation and arrangement of parts, an example of which is given in this specification and illustrated in the accompanying drawings, wherein:—

Figure 3 shows a side view partially in section of another type of the machines.

Figures 4, 5 and 6 show plan views of different types of holder employed.

Figures 7, 8 and 9 show vertical sectional views of these types of holders.

Figure 1:
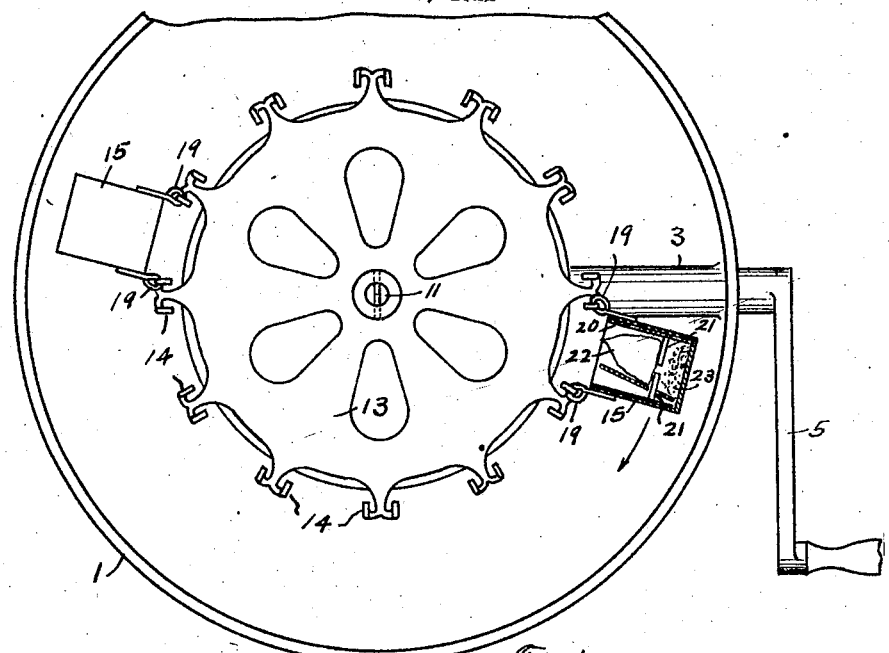
Figure 1 shows a fragmentary plan view of the machine with the cover removed.

In the drawings the numeral 1 designates a bowl like container having the covering 2 which is removable. At one side this container has the long radiating bearing 3 formed in the bottom thereof, in which the shaft 4 rotates. The outer end of this shaft is formed to receive a crank 5 by means of which it may be rotated, and fixed on the inner end of the shaft there is a bevel gear wheel 6 in mesh with a pinion 7, which is fixed on the lower end of the vertical shaft 8, said shaft having a bearing in the bottom of the container. Fixed on the shaft 8 adjacent the pinion 7 there is a relatively large spur gear wheel 9 which is in mesh with a small spur gear wheel 10. This last mentioned gear wheel is fixed on the lower end of the vertical shaft 11 which rotates in the central bearing formed in the bottom of the bore. The parts hereinbefore described are substantially similar in all of the forms, excepting that the container 1 shown in Figure 3 is formed with an annular receiving pocket 12 all the way around, and for a purpose to be hereinafter explained.

Figure 2:
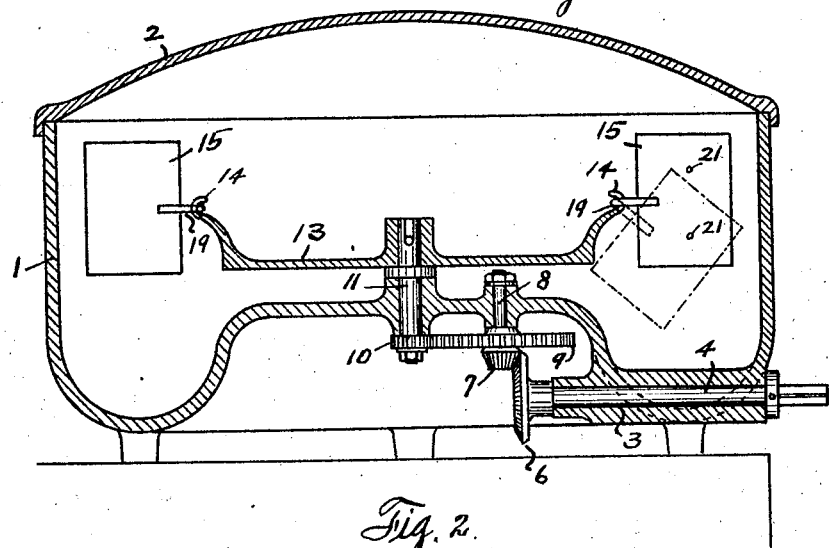
Figure 2 shows a vertical sectional view thereof.

In the forms illustrated in Figures 1, 2 and 3 there is a rotary turret 13, which is fixed on the upper end of the shaft 11, and the margin of this turret has a plurality of pairs of spaced hooks 14 provided to carry the holders. These holders may be of different forms, and the different types of holders are designated by the numerals 15, 16, 17 and 18. Each type of holder is provided with the lateral ears 19, 19 adapted to be engaged over the respective pairs of hooks 14, as illustrated in Figures 1, 2 and 3, thus providing for the easy attachment of the holders 2, or detachment from the turret. The type of holder illustrated in Figures 1 and 2 is box like in form, and is preferably formed of sheet metal. A removable liner 20 is adapted to be inserted therein and is formed with the oppositely disposed inwardly extending supporting arms 21, 21. The crab or other shell fish 22 is inserted in the holder, as illustrated in Figure 3 and the turret supplied with a load of holders, that is a holder is hooked onto each pair of hooks. The shell fish will engage against the arms 21 and will thereby be held spaced from the bottom of the holder. The turret is then rapidly rotated through the instrumentality of the crank 5. The meat is thrown by centrifugal force from the shell and falls into the bottom of the holder at 23. The holders may then be disengaged from the hooks 14 and the liner 20 removed and the meat may then be easily emptied out of said holder.

When the type of machine illustrated in Figure 3 is employed the holder of the type designated by the numerals 16, 17 and 18 is used. This holder is open at the top and bottom, and is provided with the inwardly projecting arms as 24, or the cross bars as 25, or the engaging teeth as 26, 27.

Figure 10:
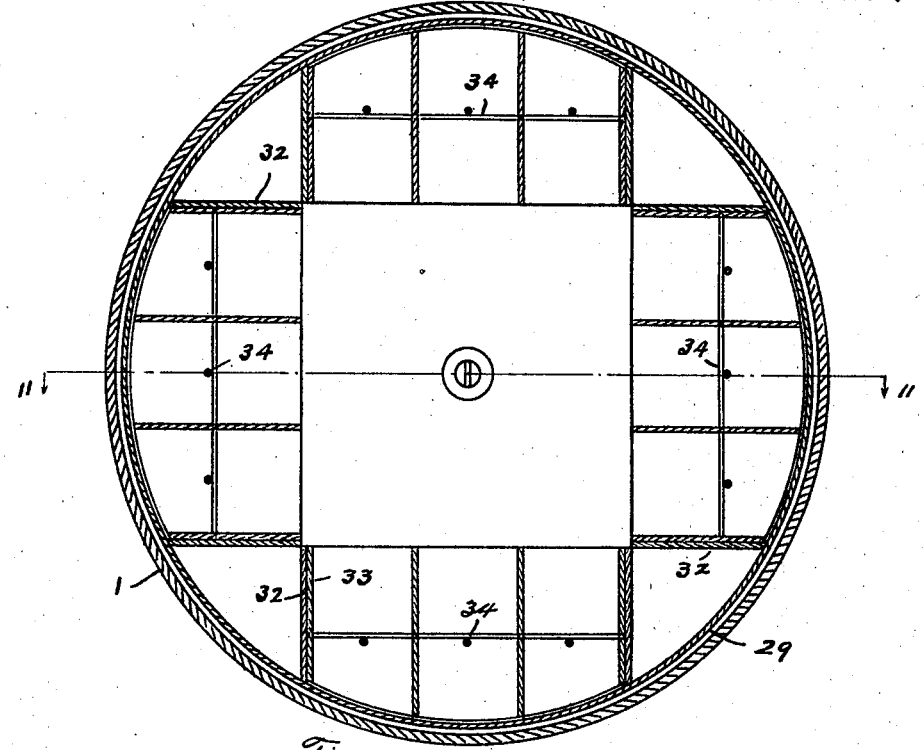
Figure 10 shows a transverse sectional view of still another type of the machine taken on the lines 10—10 of Figure 11.
Figure 11:
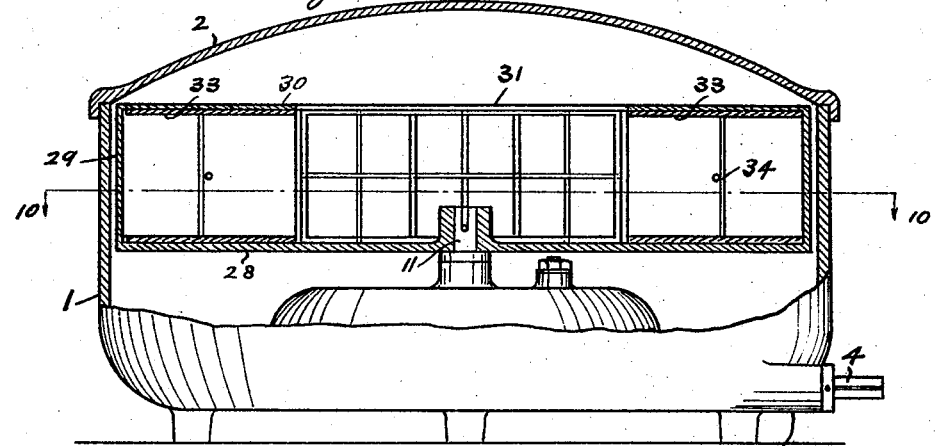
Figure 11 shows a vertical sectional view thereof taken on the line 11, 11 of Figure 10.
Figure 12:
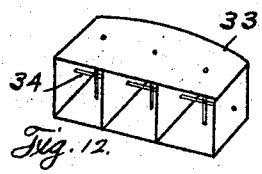
Figure 12 shows a perspective view of a holder employed in this type of the machine.

The crabs or other shell fish are placed in these holders and the holders engaged over the pairs of hooks 14, and the turret rotated as above stated. The rapid rotation of the turret will throw the meat by centrifugal force into the receiving pocket 12 of the container from which it may be readily removed, and the shells will be held in the holder by the retaining means therein, provided. In the form shown in Figures 10 and 11, a turret 28 is fixed to the upper end of the shaft 11. This turret is formed with a disc-like bottom and an annular side wall 29 to the upper edge of which there is secured the ring-like covering 30, having the open center 31. This turret is provided with a plurality of radial pockets 32 in which holders, as 33 are inserted. This type of holder is illustrated in Figure 12, and is provided with a plurality of compartments each provided to receive a crab or other shell fish, and has the cross bars 34 serving as retaining means. The crab or other shell fish are placed in the compartments of the holder 33 and rest against the retaining bars 34, and these holders are then inserted into the pockets through the open center 31, and the turret is then rapidly rotated and the meat will be thrown by centrifugal force from the shell and will pass through the retaining means 34 into the outer end of the holder compartment. Said holders may then be removed and the meat and shell removed from them separately.

What I claim is:—

1. A device of the character described including a container, a rotary turret mounted therein, means for rotating the turret, and a plurality of independent holders carried by the turret and detachable therefrom, a removable liner in each holder having a shell retainer compartment and a meat receiving compartment.

2. A device of the character described including a container, a rotary turret mounted therein, means for rotating the turret, a plurality of independent holders carried by the turret and detachable therefrom, and a removable liner in each holder having a shell retaining and meat retaining compartment therein.

3. A device of the character described including a container, a rotary member therein, means for rotating said member, a plurality of holders carried by said rotary member a liner in each holder, and two retaining compartments in each liner.

4. A device of the character described including a container, a rotary turret mounted therein, means for rotating said turret, a plurality of pairs of hooks carried by the turret, a plurality of holders each formed with ears adapted to engage over the hooks of the respective pairs, and a removable liner in each holder having shell retaining means therein.

5. A device of the character described including a container, a rotary turret mounted therein, means for rotating said turret, a plurality of pairs of hooks carried by the turret, a plurality of holders each formed with ears adapted to engage over the hooks of the respective pairs, and retaining means within each holder, said retaining means including a liner with shell retainers therein.

6. A device of the character described including a container formed with an annular integral retaining pocket, a rotary turret mounted in the container, means for rotating the turret, a holder carried by the turret in alignment with said pocket, and shell retaining means in each holder.

7. A device of the character described including a container formed with an annular integral pocket, a rotary turret mounted in the container, means for rotating the turret, a plurality of holders carried by the turret and detachable therefrom, said holders moving in alignment with said pocket as the turret rotates, and shell retaining means in each holder.

8. A device of the character described including a container formed with an annular receiving pocket, a rotary turret mounted in the container, means for rotating the turret, a plurality of holders carried by the turret and detachable therefrom, each holder being open at both ends, shell retaining means in each holder, said holders moving in alignment with said pocket as the turret rotates.

In testimony whereof I have signed my name to this specification in the presence of two subscribing witnesses.

GEORGE LIEBERMAN.

Witnesses:
   JAS. W. OLIVER,
   E. V. HARDWAY.